Patented Nov. 21, 1922.

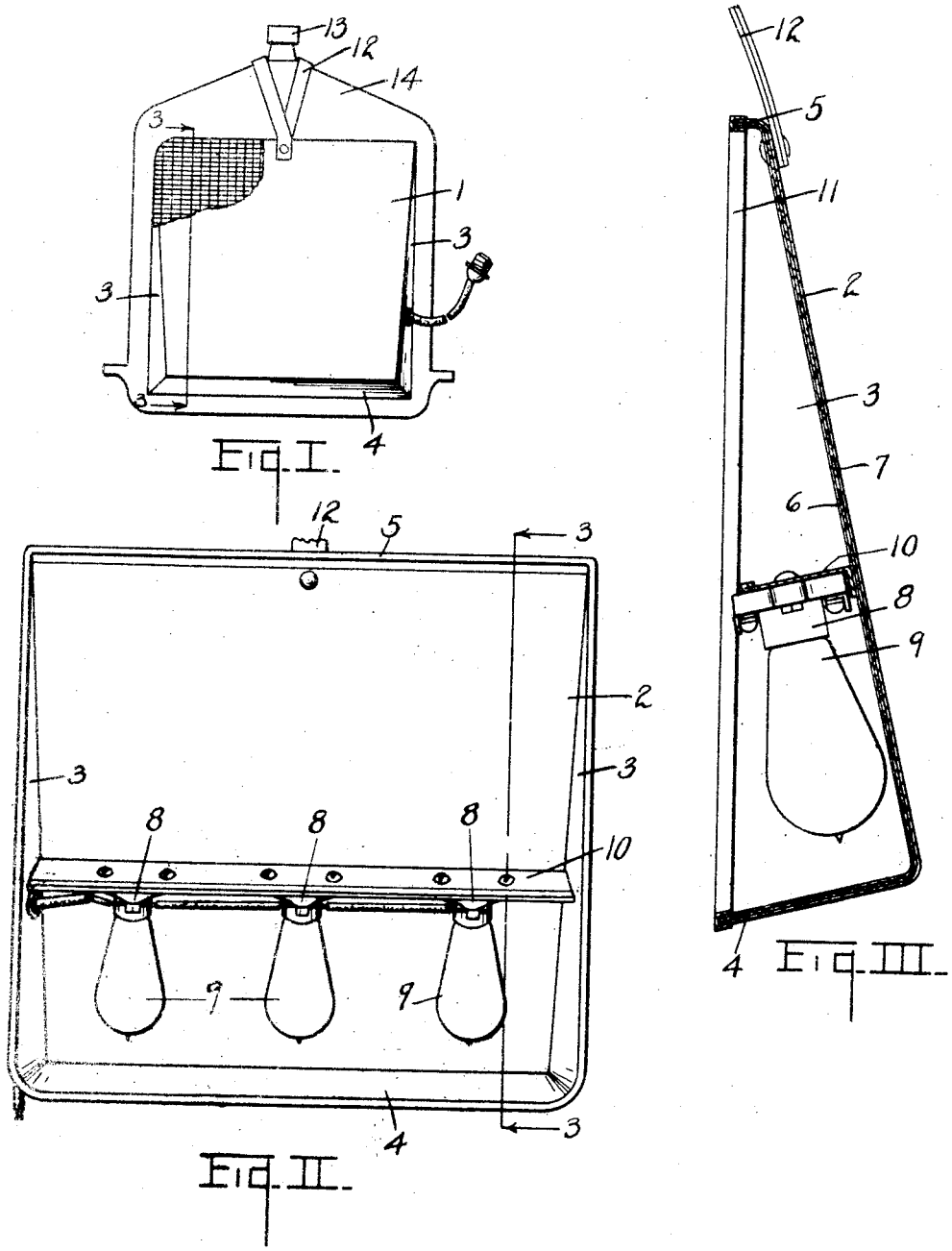

1,436,060

UNITED STATES PATENT OFFICE.

ROSWELL B. STRONG, OF COLDWATER, MICHIGAN.

HEATER FOR AUTOMOBILE RADIATORS.

Application filed December 8, 1921. Serial No. 520,791.

*To all whom it may concern:*

Be it known that I, ROSWELL B. STRONG, a citizen of the United States, residing at Coldwater, county of Branch, State of Michigan, have invented certain new and useful Improvements in Heaters for Automobile Radiators, of which the following is a specification.

This invention relates to improvements in heaters for automobile radiators.

The main objects of the invention are:

First, to provide an improved heater for automobile radiators which is very efficient and at the same time simple and eonomical in structure.

Second, to provide an improved heater for automobile radiators which may be quickly applied to or removed from the radiator.

Further objects, and objects relating to structural details, will definitely appear from the detailed description to follow.

I accomplish the objects of the invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a front view of an automobile radiator with one of my improved heaters applied thereto, the heater being partially broken away to disclose its relation to the radiator core.

Fig. II is a front view of my improved radiator heater.

Fig. III is a vertical section on a line corresponding to line 3—3 of Figs. I and II.

In the drawing similar reference characters refer to similar parts throughout the several views.

Referring to the drawing, I provide a casing, designated generally by the numeral 1, the casing being open at the front and adapted to be disposed over the face of an automobile radiator. The casing comprises an outer wall drawn or stamped up from sheet metal and comprising a forwardly inclined rear wall 2, side walls 3, bottom 4 and top 5. The rear wall is forwardly inclined while the bottom wall is preferably also forwardly inclined, the casing being upwardly tapered in general form or shape.

I provide a lining 6 for these walls of flexible material, such as tin or polished aluminum. Between the lining and the casing walls is a layer of heat insulating material 7.

A partition plate 10 is disposed horizontally in a spaced relation to the bottom, this plate being arranged at right angles to the rear wall of the casing. On the under side of this partition plate are sockets 8 for the heating units 9 which as illustrated are lamp bulbs. Ordinary lamp bulbs may be effectively used although lamp bulbs having resistance calculated to produce heat are on the market and by using such bulbs the heating capacity of the heater will be increased.

The partition plate is preferably of reflecting material such as polished aluminum or tin. The forward edge of this plate is spaced to form the edge of the casing so as to permit the upward circulation of the heated air against the face of the radiator, the plate thus serving the function of a support for the heating units, a reflecting surface and a deflector or baffle for the heat.

Having thus described my invention, what I claim as new and desire to secure by Letters Patent, is:

1. In an automobile radiator heater, the combination of a casing open at the front and adapted to be disposed over the face of a radiator, the bottom and rear walls of said casing being forwardly inclined, a lining of reflecting material for said casing, there being a layer of heat insulating material between the lining and casing, a facing for the edges of the casing walls, a horizontally disposed partition plate disposed in a spaced relation to the said bottom, the forward edge of the said plate being spaced from the edge of the casing, electric heating unit sockets mounted on the under side of said partition plate, heating units disposed in said sockets, and a suspending means for said casing.

2. In an automobile radiator heater, the combination of a casing open at the front and adapted to be disposed over the face of a radiator, the bottom and rear walls of said casing being forwardly inclined, a lining of reflecting material for said casing, a horizontally disposed partition plate disposed in a spaced relation to the said bottom, the forward edge of the said plate being spaced from the edge of the casing, electric heating unit sockets mounted on said partition plate, heating units disposed in said sockets, and a suspending means for said casing.

3. In an automobile radiator heater, the combination of a casing open at the front and adapted to be disposed over the face of a radiator, the rear wall of said casing being forwardly inclined, a lining of reflecting material for said casing, a horizontally disposed partition plate, the forward edge of the said plate being spaced from the edge of the casing, electric heating unit sockets mounted on said partition plate, heating units disposed in said sockets, and a suspending means for said casing.

4. In an automobile radiator heater, the combination of a casing open at the front and adapted to be disposed over the face of a radiator, the bottom and rear walls of said casing being forwardly inclined, a lining of reflecting material for said casing, there being a layer of heat insulating material between the lining and casing, a facing for the edges of the casing walls, electric heating unit sockets mounted within said casing, heating units disposed in said sockets so that they are supported in the lower part of said casing, and a suspending mean for said casing.

5. In an automobile radiator heater, the combination of a casing open at the front and adapted to be disposed over the face of a radiator, the bottom and rear walls of said casing being forwardly inclined, a heating unit mounted in said casing, a horizontally disposed partition plate disposed above the heating unit, the forward edge of said plate being spaced from the edge of the casing, and a suspending means for said casing.

6. In an automobile heater, the combination of a casing open at the front and adapted to be disposed over the face of a radiator, the rear wall of said casing being forwardly inclined, a lining of reflecting material for said casing, there being a layer of heat insulating material between the lining and casing, a facing for the edges of the casing walls, a horizontally disposed partition plate, the forward edge of said plate being spaced from the edge of the casing, an electric heating unit disposed below said partition plate, and a suspending means for said casing.

7. In an automobile heater, the combination of a casing open at the front and adapted to be disposed over the face of a radiator, the rear wall of said casing being forwardly inclined, a horizontally disposed partition plate, the forward edge of said plate being spaced from the edge of the casing, an electric heating unit disposed below said partition plate, and a suspending means for said casing.

In witness whereof, I have hereunto set my hand and seal.

ROSWELL B. STRONG.